United States Patent [19]
Law et al.

[11] Patent Number: 6,044,928
[45] Date of Patent: Apr. 4, 2000

[54] TIRE MOUNTABLE STEPSTOOL

[76] Inventors: Bruce Law, 312 W. Honda Bow Rd., Phoenix, Ariz. 85027; John E. Toner, 5202 N. 106th Dr., Glendale, Ariz. 85307

[21] Appl. No.: 09/166,065

[22] Filed: Oct. 2, 1998

[51] Int. Cl.[7] .................................................... E04G 3/10
[52] U.S. Cl. .......................... 182/150; 182/206; 280/165
[58] Field of Search .................................. 182/150, 187, 182/206; 280/165, 163, 166

[56] References Cited

U.S. PATENT DOCUMENTS

| | | | |
|---|---|---|---|
| 3,590,950 | 7/1971 | Wilson | 182/150 |
| 4,947,961 | 8/1990 | Dudley | 182/206 X |
| 5,133,429 | 7/1992 | Densley | 182/150 |

OTHER PUBLICATIONS

Harbor Freight Tools Catalog, undated, p. 4, item No. 32044–5CXH.

*Primary Examiner*—Daniel P. Stodola
*Assistant Examiner*—Hugh B. Thompson
*Attorney, Agent, or Firm*—Meschkow & Gresham, P.L.C.; Jordan M. Meschkow; Lowell W. Gresham

[57] ABSTRACT

A stepstool (20) configured for mounting on a vehicular tire (22) includes a support frame configured to rest against an outer surface (38) of the tire (22). The support frame includes a first upright support (24), a second upright support (26), and a third support (28) coupled to each of the first and second upright supports (24, 26). A platform (30) is attached to the support frame. A retaining bar (36) is configured to rest against an inner surface (40) of the tire (22). Chains (32 and 34) link the retaining bar (36) to each of the first and second upright supports (24, 26). The chains (32 and 34) are directed over an upper circumferential surface (83) of the tire and wrap around the upper circumferential surface (83) to hold the platform (30) securely on the tire (22).

20 Claims, 4 Drawing Sheets

TIRE MOUNTABLE STEPSTOOL

TECHNICAL FIELD OF THE INVENTION

The present invention relates generally to stepstools, and more particularly to stepstools for use with high profile vehicles.

BACKGROUND OF THE INVENTION

The height of high profile vehicles, such as trucks, vans, sport utility vehicles (SUVs), and recreational vehicles (RVs) poses a problem for many people when loading or unloading such vehicles. For example, because of the excessive height of a large pickup truck, it is often difficult for individuals to load luggage, equipment, or other such items into the bed of the truck. Likewise, due to the excessive height of vans, SUVs, and so forth, it is often difficult for individuals to reach a roof-mounted luggage rack for the purpose of loading or unloading luggage or equipment.

In addition, the act of lifting heavy items from ground level to a height great enough to reach the truck bed or luggage rack causes undesirable strain on the lifter's body. Many injuries to the spine, legs, and arms are caused by improper lifting techniques and by lifting unwieldy items to and from excessive heights.

One recourse individuals have when loading or unloading a high profile vehicle is to stand on a platform, such as a stepladder, stepstool, chair, or box, positioned on the ground near the vehicle. The individual can then stand on the platform to load items onto or unload items from the truck bed or luggage rack. Unfortunately, platforms, such as ladders and stepstools are often cumbersome to set up and properly position. In addition, such a platform may not be readily available for use when the vehicle reaches its destination.

An even more serious problem with platforms placed on the ground is the inherent instability of such items. For example, if a ladder is placed on an unstable surface, such as sand or dirt, or on a surface that is not level, the movement of an individual on the ladder can cause it to tip over. A ladder crashing into the side of the vehicle can create scratches or dents in the body of the vehicle. However, a more critical consequence of a tipping ladder is that an individual standing on the ladder may be injured when the ladder falls.

To resolve the problems associated with platform unavailability and tipping ladders, some vans and RVs are equipped with a ladder which is attached to the rear of the vehicle or to the luggage rack. Since a vehicle-mounted ladder is physically attached to the vehicle, the vehicle-mounted ladder is always available for use with that vehicle. Moreover, the vehicle-mounted ladder cannot tip over. Unfortunately, vehicle-mounted ladders are conventionally not provided on many vehicles, such as pickup trucks.

In addition, the vehicle-mounted ladders cannot be readily moved from one vehicle to an another vehicle, or even from one area of vehicle to another area on the same vehicle. Accordingly, vehicle-mounted ladders have rather limited potential for use.

Another type of vehicle-mounted platform mounts generally to a vehicle tire. The tire-mounted platform includes a support frame, a portion of which rests on the surface upon which the vehicle is parked. A platform is bolted to the support frame. Since the tire mounted platform is supported by the surface upon which the vehicle is parked, this tire mounted platform might not be mounted to the tire in a relatively horizontal position. In other words, if the vehicle is parked on an incline, the platform is oriented relative to the inclined position of the vehicle. This inclined position of the platform is difficult for the user to stand on. In addition, the support frame of this tire mounted platform is attached via rigid tubular members to a bar that rests on an inside surface of the tire. These rigid tubular members extend from the outer surface of the tire and pose a safety hazard to a user if he or she bumps or falls against them.

SUMMARY OF THE INVENTION

Accordingly, it is an advantage of the present invention that an improved stepstool is provided for mounting on a vehicular tire.

Another advantage of the present invention is that a stepstool is provided having a stable configuration.

Another advantage of the present invention is that a portable stepstool is provided.

Yet another advantage of the present invention is that a stepstool is provided that can be used on a variety of vehicles.

The above and other advantages of the present invention are carried out in one form by a stepstool for mounting on a vehicular tire. The stepstool includes a support frame configured to rest against an outer surface of the tire and a platform attached to the support frame. The stepstool further includes a retaining bar configured to rest against an inner surface of the tire, and a means for linking the retaining bar with the support frame. The linking means is directed along an upper circumferential surface of the tire and is flexible for securely wrapping around the tire about the upper circumferential surface.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
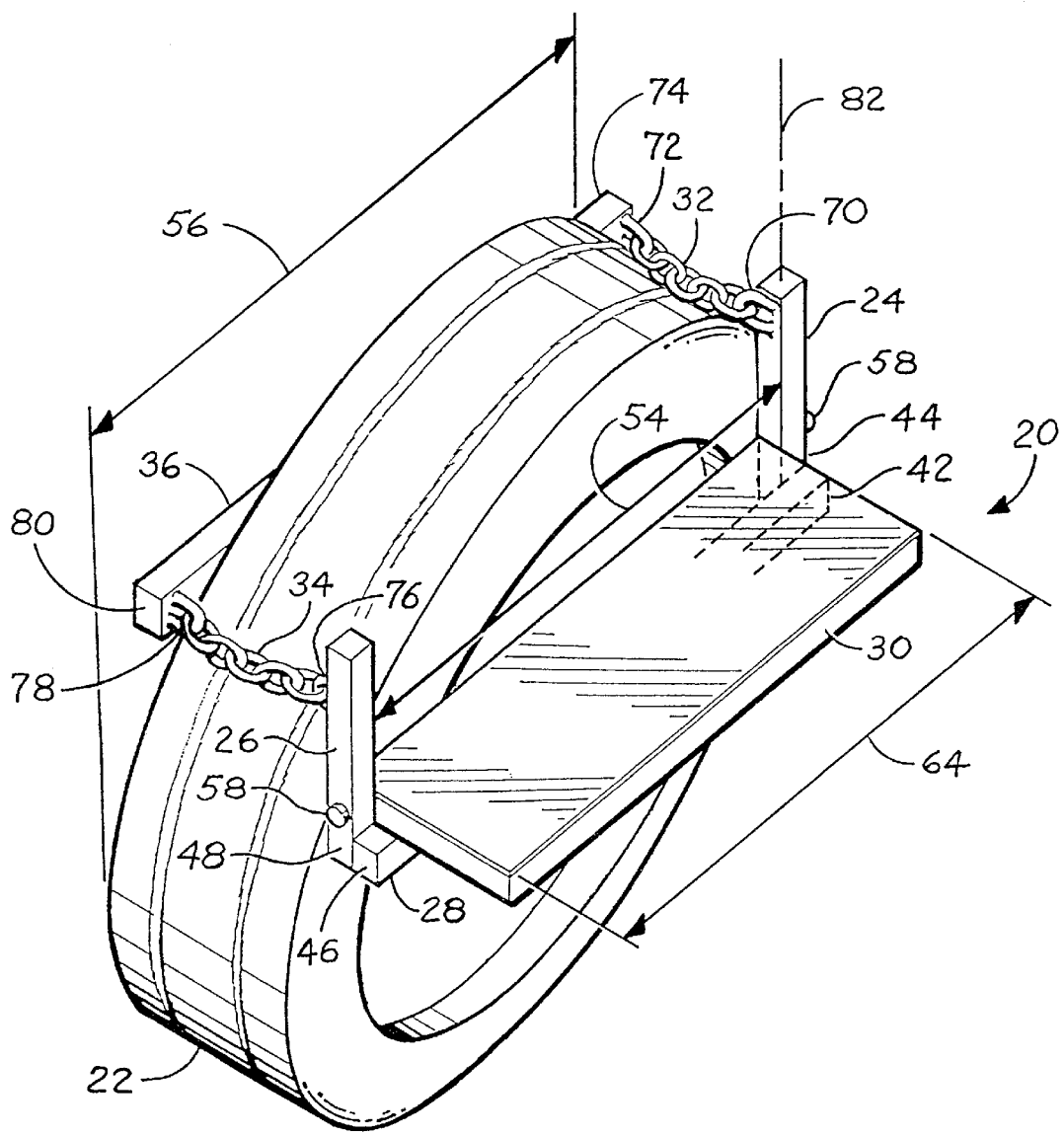
FIG. 1 shows a perspective view of a stepstool mounted on a vehicular tire.
Figure 2:
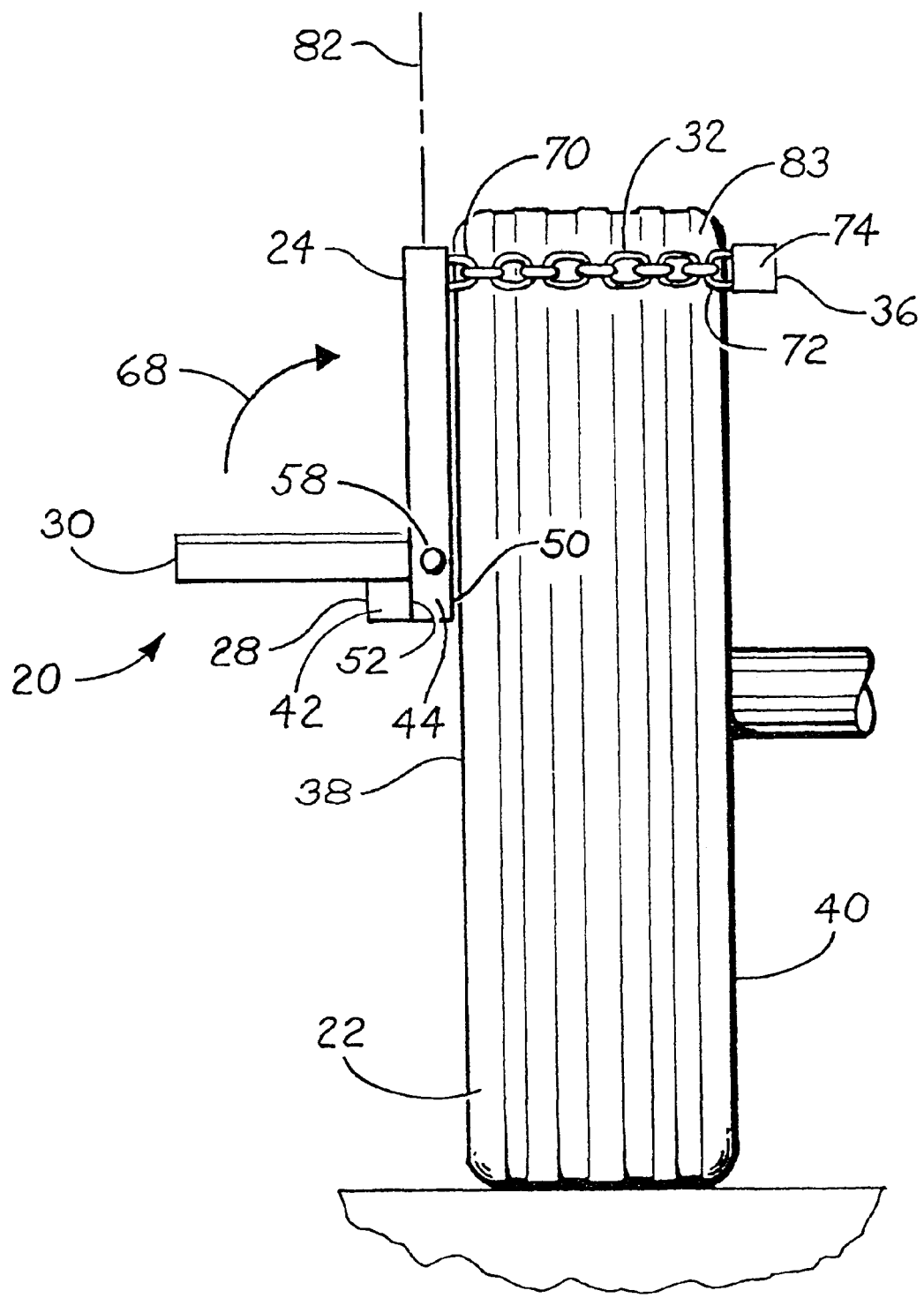
FIG. 2 shows a side view of the vehicular tire with the stepstool in a deployed position.

Referring to FIGS. 1–2, FIG. 1 shows a perspective view of a stepstool 20 mounted on a vehicular tire 22. FIG. 2 shows a side view of tire 22 with stepstool 20 in a deployed position. Tire 22 is attached to a high profile vehicle (not shown) such as a truck, van, sport utility vehicle (SUV), recreational vehicle (RV), and so forth. Thus, when stepstool 20 is used in cooperation with tire 22, a platform is provided for reaching into a truck bed or up to a luggage rack. In addition, the platform may be used by an individual as a seat.

Stepstool 20 includes a support frame having a first upright support 24, a second upright support 26, and a third support 28. A platform 30 is attached to first and second upright supports 24 and 26, respectively. A first chain 32 and a second chain 34 link a retaining bar 36 to first and second upright supports 24 and 26. First and second upright supports 24 and 26 are configured to contact an outer surface 38 of tire 22, and retaining bar 36 is configured to contact an inner surface 40 of tire 22. Stepstool 20 is desirably formed from a high strength, material such as metal, wood, plastic, or some combination thereof.

Third support 28 has a first end 42 coupled to a first upright end 44 of first upright support 24. Likewise, third support 28 has a second end 46 coupled to a second upright end 48 of second upright support 24. First and second upright supports have a tire contacting side 50 configured to contact outer surface 38 of tire 22. Third support 28 is attached to first and second upright supports 24 and 26, respectively, on a side 52 which is opposite tire contacting side 50. Third support 28 is coupled to first and second upright supports 24 and 26 by conventional means such as bolts or welding.

Third support 28 is coupled to the ends of each of first and second upright supports 24 and 26, respectively, to provide strength and structural stability to the support frame, as well as for ease of manufacture. However, those skilled in the art will recognize that the support frame may be configured any of a number of ways. For example, the support frame may be configured such that first and second ends 42 and 46, respectively, extend beyond first and second upright ends 44 and 48, respectively. In addition, third support 28 may be coupled to first and second upright supports 24 and 26 such that first and second upright ends 44 and 48 extend below third support 28.

First and second upright supports 24 and 26 are separated by a distance 54 which is less than a diameter 56 of tire 22 so that a substantial portion of tire contacting side 50 of first and second upright supports 24 and 26, respectively, rests on outer surface 38 of tire 22. In addition, first and second upright supports 24 and 26 are substantially perpendicular to third support 28 for ease of manufacture and to provide structural stability.

Platform 30 is attached to first and second upright supports 24 and 26 with pivoting fasteners 58 such that platform 30 rotates about pivoting fasteners 58. Thus, platform 30 can be adjusted between a deployed position and a stowed position. Platform 30 rests on third support 28 when stepstool 20 is deployed. Thus, third support 28 desirably functions to provide additional strength to support an individual's weight when standing or sitting on platform 30.

Platform 30 exhibits a length 64 which is less than distance 54 separating first and second upright supports 24 and 26, respectively. When platform 30 rotates to a stowed position, referred to generally by a curved arrow 68, platform 30 fits between first and second upright supports 24 and 26. Accordingly, in the stowed position, stepstool 20 is quite compact and can be readily stored in the vehicle for use at a vehicle destination.

First chain 32 has a first chain end 70 attached to first upright support 24 and a second chain end 72 for attachment to a first bar end 74 of retaining bar 36. Likewise, second chain 34 has a third chain end 76 attached to second upright support 26 and a fourth chain end 78 for attachment to a second bar end 80 of retaining bar 36. First chain end 70 is attached by welding or fasteners to first upright support 24 in a direction which is substantially perpendicular to a longitudinal axis 82 of first upright support 24. Likewise, third chain end 76 is attached by welding or fasteners to second upright support 26 in a direction which is substantially perpendicular to longitudinal axis 82. In addition, first and third chain ends 70 and 76 are attached to first and second upright supports 24 and 26 such that first and second chains 32 and 34 are directed toward inner surface 40 of tire 22 when stepstool 20 is mounted on tire 22.

The attachment configuration of first and second chains 32 and 34 relative to first and second upright supports 24 and 26, respectively, and the flexibility of first and second chains 32 and 34 cause first and second chains 32 and 34 to wrap around tire 22 securely about an upper circumferential surface 83 of tire 22. The secure fit of first and second chains 32 and 34 to tire 22 prevents stepstool 20 from sliding off of tire 22 when weight is applied to platform 30. In addition, the secure fit prevents stepstool 20 from shifting as more weight is placed on one end of platform 30 than the other end of platform 30.

Figure 3:
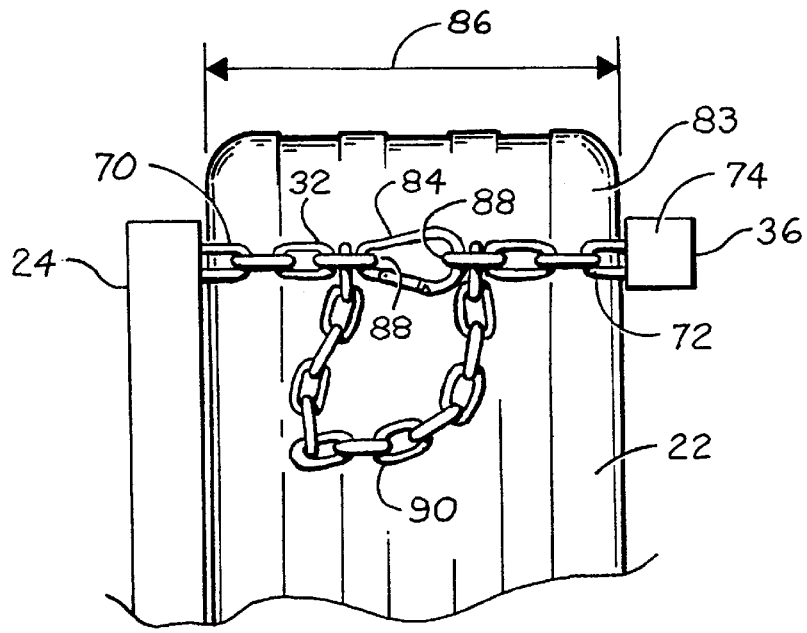
FIG. 3 shows an illustration of a clasp for adjusting a length of chain linking a support frame and a retaining bar of the stepstool.

FIG. 3 shows an illustration of a clasp 84 for adjusting a length of first chain 32 linking first upright support 24 of the support frame and retaining bar 36 of stepstool 20. In the preferred embodiment, the length of first chain 32 may be adjusted by the use of clasp 84 to accommodate a tire width 86 of tire 22. Clasp 84 may be any of a number of conventional high strength, quick release clasps. The length of first chain 32 is adjusted, when two chain links 88 are captured by clasp 84. The remaining links hang as slack chain 90 from chain links 88. While only first chain 32 is illustrated, it should be readily understood that second chain 34 links second upright support 26 to retaining bar 36 using a second clasp 84 in a similar manner. Accordingly, the length of first and second chains 32 and 34 are adjustable to accommodate a variety of tire sizes and widths.

Figure 4:
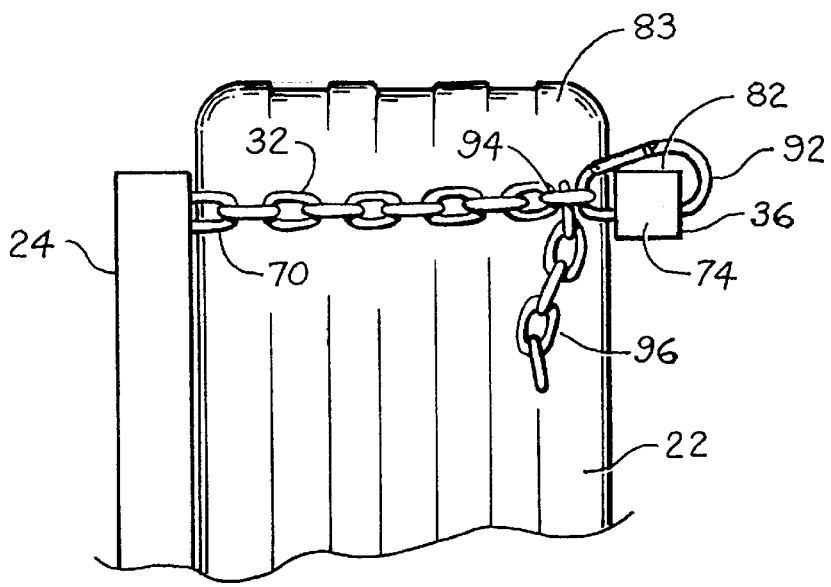
FIG. 4 shows an illustration of an alternate embodiment of a clasp used with the chain.

FIG. 4 shows an illustration of an alternate embodiment of a clasp 92 used with first chain 32. In the alternate embodiment, first chain 32 is attached to first upright support 24 in the orientation described above. A clasp 92 captures a chain lino 94. Clasp 92 is then passed through a drilled hole (not shown) in first bar end 74 of retaining bar 36. The unused chain hangs as slack chain 96 from chain link 94.

While clasp 92 may be larger than clasp 84 (FIG. 3) in order to accommodate passage through first bar end 74, this alternate embodiment simplifies the manufacture of stepstool 20 by eliminating the need for fasteners or welds to attach first chain 32 to first bar end 74. It should be readily understood that when this alternate embodiment is implemented, second chain 34 links second upright support 26 to retaining bar 36 using a second clasp 92 in a similar manner.

Figure 5:
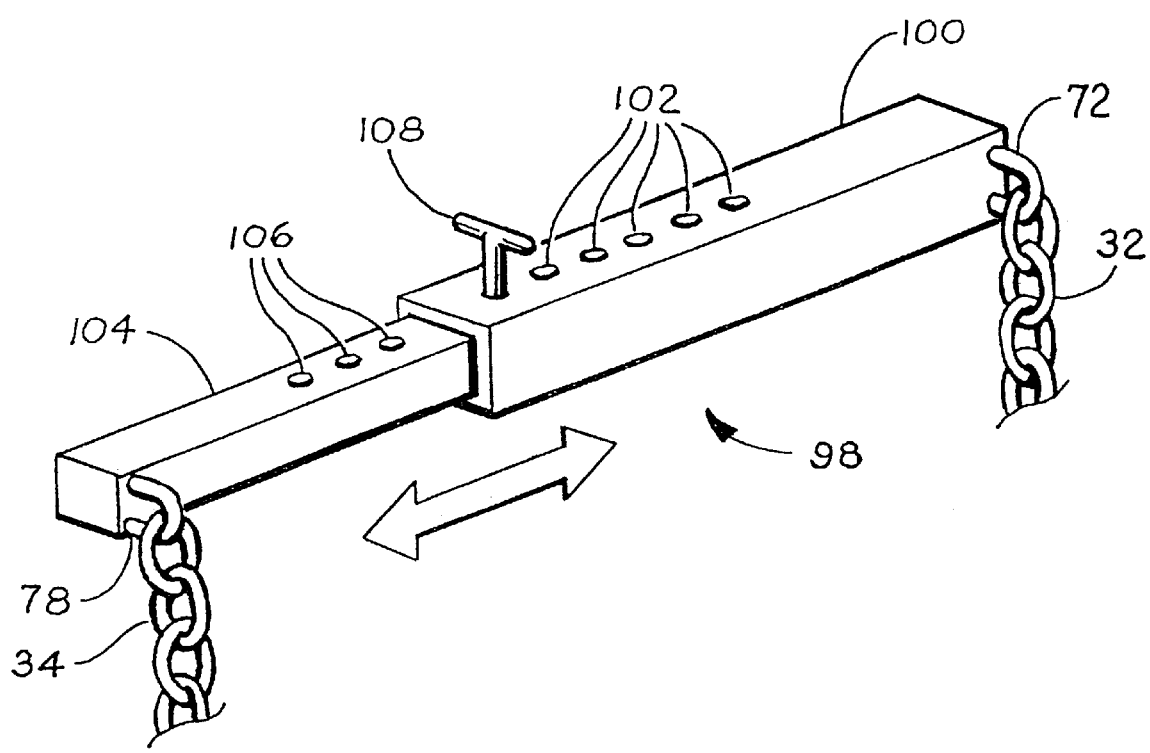
FIG. 5 shows an illustration of an adjustable length retaining bar in an alternate embodiment of the present invention.

FIG. 5 shows an illustration of an adjustable length retaining bar 98 in an alternate embodiment of the present invention. Vehicular tires are typically located in a vehicle's wheel wells. The size of a wheel well may vary significantly between differing vehicles. Since retaining bar 36 (FIG. 1) is passed over tire 22 (FIG. 1), retaining bar 36 may not fit in the wheel wells of some vehicles. Thus, adjustable length retaining bar 98 is used to accommodate a variety of wheel well sizes.

Adjustable length retaining bar 98 includes an outer sleeve 100 coupled to first chain 32. Outer sleeve 100 includes periodically spaced holes 102. An inner sleeve 104, having periodically spaced holes 106, is coupled to second chain 34 and is configured to slide within outer sleeve 100. A holding pin, in the form of a quick release pin 108, is configured to pass through holes 102 of outer sleeve 100 that are aligned with holes 106 of inner sleeve 104.

Adjustable length retaining bar 98 is adjusted to the appropriate length by sliding inner sleeve 104 into or out of outer sleeve 100. When the appropriate length is determined quick release pin 108 is passed through aligned holes 102 and 106 to secure adjustable retaining bar 98 at the adjusted length. Thus, stepstool 20 (FIG. 1), implemented with adjustable length retaining bar 98, can be used with a wide variety of vehicles.

The configuration of stepstool 20 is such that when an individual stands on platform 30, the force of first and second upright supports 24 and 26 against outer surface 38 (FIG. 2) of tire 22 translates to force from retaining bar 36 or adjustable length retaining bar 98 against inner surface 40 (FIG. 2). These forces combine to form a stable and secure stepstool upon which an individual may stand or sit. Furthermore, since stepstool 20 merely rests on tire 22, it can be adjusted to provide the user a relatively horizontal platform upon which to stand, regardless of the incline of the surface upon which the vehicle is parked. In addition, stepstool 20 can be readily moved to different tires on the same vehicle, or to a tire on a different vehicle.

In summary, the present invention provides a stepstool for mounting on a vehicular tire. The stepstool is configured such that it rests on and is supported by the tire. The location of the flexible linking means, or chains, on the ends of the retaining bar and the upright supports provides a stepstool having a stable configuration. In addition, since the stepstool does not sit on the ground, the stepstool is not subject to the incline of and the inherent instability of the surface on which the tire is setting. The stepstool can be easily moved from one tire to the next and can be folded in a stowed configuration for storing in the vehicle. Furthermore, the adjustable chain feature and the adjustable retaining bar feature allows the stepstool to be used with a variety of vehicles Although the preferred embodiments of the invention have been illustrated and described in detail, it will be readily apparent to those skilled in the art that various modifications may be made therein without departing from the spirit of the invention or from the scope of the appended claims. For example, flexible cables may be used in lieu of chains and a variety of fasteners may be selected to interconnect the support frame and to attach the platform to the support frame.

What is claimed is:

1. A vehicular stepstool system comprising:
a vehicular tire;
a support frame configured to rest against an outer surface of said tire, said support frame having first and second upper ends;
a platform attached to said support frame;
a substantially straight retaining bar configured to rest against an inner surface of said tire, said retaining bar having first and second bar ends; and
linking members coupled to said retaining bar with said support frame, said linking members attached to and extending substantially perpendicularly from said first and second bar ends and attached to said first and second upper ends of said support frame, said linking members configured to be directed across an upper circumferential surface of said tire, and said linking members being flaccid so that said linking members essentially conform to the outer surface of said tire when directed across said upper circumferential surface.

2. A vehicular stepstool system as claimed in claim 1 wherein said support frame exhibits a width, said width configured to be less than a diameter of said tire.

3. A vehicular stepstool system as claimed in claim 1 wherein said support frame comprises:

a first upright support;
a second upright support; and
a third support having a first end coupled to a first upright end of said first upright support and having a second end coupled to a second upright end of said second upright support.

4. A vehicular stepstool system as claimed in claim 3 wherein said third support is positioned substantially perpendicular to each of said first and second upright supports.

5. A vehicular stepstool system as claimed in claim 3 wherein each of said first and second upright supports includes a tire contacting side, and said third support is attached to said first and second upright supports on a side opposite from said tire contacting side.

6. A vehicular stepstool system as claimed in claim 5 further comprising fasteners for attaching said platform to each of said first and second upright supports proximate said first and second upright ends so that said platform rests on said third support.

7. A vehicular stepstool system as claimed in claim 1 further comprising fasteners for pivotally attaching said platform to said support frame.

8. A vehicular stepstool system as claimed in claim 7 wherein said support frame comprises:
a first upright support; and
a second upright support separated by a distance from said first upright support, said distance being measured from an inner surface of said first upright support to an inner surface of said second upright support, said inner surfaces facing one another, and said platform exhibits a length which is less than said distance such that said platform fits between said first and second upright supports.

9. A vehicular stepstool system as claimed in claim 1 wherein said retaining bar comprises:
an outer sleeve having periodically spaced holes;
an inner sleeve configured to slidably fit in said outer sleeve, said inner sleeve having periodically spaced holes; and
a holding pin for passing through aligned ones of said periodically spaced holes of said outer sleeve and said inner sleeve for securing said retaining bar at an adjusted length.

10. A vehicular stepstool system as claimed in claim 1 wherein said linking members comprise:
a first chain having a first chain end attached to said first upper end of a first upright support of said support frame and a second chain end for attachment to said first bar end; and
a second chain having a third chain end attached to said second upper end of a second upright support of said support frame and a fourth chain end for attachment to said second bar end.

11. A vehicular stepstool system as claimed in claim 10 wherein:
said first chain end is attached to said first upper end in a direction substantially perpendicular to a long axis of said first upright support such that said first chain is directed toward said inner surface of said tire when said stepstool is mounted on said tire; and
said third chain end is attached to said second upper end in a direction substantially perpendicular to a long axis of said second upright support such that said second chain is directed toward said inner surface of said tire when said stepstool is mounted on said tire.

12. A vehicular stepstool system as claimed in claim 10 wherein said stepstool further comprises:
   a first clasp coupled to said first chain for adjusting a length of said first chain; and
   a second clasp coupled to said second chain for adjusting a length of said second chain.

13. A vehicular stepstool system as claimed in claim 12 wherein:
   said first clasp is configured to couple said second chain end to said first bar end of said retaining bar; and
   said second clasp is configured to couple said fourth chain end to said second bar end of said retaining bar.

14. A stepstool for mounting on a vehicular tire:
   a support frame including a first upright support having a first upper end, a second upright support having a second upper end, and a third support coupled to each of said first and second upright supports, said first and second upright supports being configured to rest against an outer surface of said tire;
   a platform attached to said support frame;
   a substantially straight retaining bar configured to rest against an inner surface of said tire, said retaining bar having first and second bar ends;
   a first chain having a first chain end and a second chain end, said first chain end being attached to said first upper end of said first upright support;
   a first clasp coupled to said second chain end and said first bar end of said retaining bar such that said first chain extends from said retaining bar in a direction substantially perpendicular to said retaining bar;
   a second chain having a third chain end and a fourth chain end, said third chain end being attached to said second upper end of said second upright support; and
   a second clasp coupled to said fourth chain end and said second bar end of said retaining bar such that said second chain extends from said retaining bar in a direction substantially perpendicular to said retaining bar, wherein said first and second chains are configured to be directed along an upper circumferential surface of said tire.

15. A stepstool as claimed in claim 14 wherein each of said first and second upright supports includes a tire contacting side, and said third support is attached to each of said first and second upright supports on a side opposite from said tire contacting side.

16. A stepstool as claimed in claim 14 further comprising pivoting fasteners for pivotally attaching said platform to said support frame.

17. A stepstool as claimed in claim 16 wherein a portion of said platform is configured to rest on said third support.

18. A stepstool as claimed in claim 16 wherein said first and second upright supports are separated by a distance, said distance being measured from an inner surface of said first upright support to an inner surface of said second upright support, said inner surfaces facing one another, and said platform exhibits a length which is less than said distance such that said platform fits between said first and second upright supports.

19. A stepstool for mounting on a vehicular tire, said stepstool comprising:
   a support frame including a first upright support having a first upper end, a second upright support having a second upper end, and a third support coupled to each of said first and second upright supports, said first and second upright supports being configured to contact an outer surface of said tire;
   a platform attached to said first and second upright supports and configured to rest on said third support, said platform having a length greater than its width;
   a substantially straight retainer assembly parallel to said length of said platform, said retainer assembly comprising an outer sleeve having periodically spaced holes and a first end, an inner sleeve configured to slidably fit in said outer sleeve, said inner sleeve having periodically spaced holes and a second end, and a holding pin for passing through aligned ones of said periodically spaced holes of said outer and inner sleeves for securing said retainer assembly at an adjusted length, said retainer assembly also being configured to contact an inner surface of said tire; and
   means for linking said retaining assembly with said support frame, said linking means being attached to and extending substantially perpendicularly from said first and second ends and being attached to said first and second upper ends, said linking means being flaccid and adapted to extend across an upper circumferential surface of said tire.

20. A stepstool as claimed in claim 19 wherein said linking means comprises:
   a first chain attached to said upper end of said first upright support and to said first end of said outer sleeve, said first chain being attached to said first upper end in a direction substantially perpendicular to a long axis of said first upright support such that said first chain is directed toward an inner surface of said tire when said stepstool is mounted on said tire; and
   a second chain attached to said second upper end of said second upright support and to said second end of said inner sleeve, said second chain being attached to said second upper end in a direction substantially perpendicular to a long axis of said second upright support such that said second chain is directed toward said inner surface of said tire when said stepstool is mounted on said tire.

* * * * *

UNITED STATES PATENT AND TRADEMARK OFFICE
CERTIFICATE OF CORRECTION

PATENT NO. : 6,044,928
DATED : 4 April 2000
INVENTOR(S) : Bruce Law, etal.

It is certified that error appears in the above-indentified patent and that said Letters Patent is hereby corrected as shown below:

In Column 4, Line 37,: please delete "lino" and insert --link-- therefor.

Signed and Sealed this

Sixth Day of February, 2001

Attest:

Q. TODD DICKINSON

*Attesting Officer*  *Director of Patents and Trademarks*